US007284699B2

(12) United States Patent
Hamilton

(10) Patent No.: US 7,284,699 B2
(45) Date of Patent: Oct. 23, 2007

(54) METHODS AND SYSTEMS FOR TRACKING DELIVERY ITEMS

(75) Inventor: Daryl S. Hamilton, Upper Marlboro, MD (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 10/956,384

(22) Filed: Sep. 30, 2004

(65) Prior Publication Data

US 2005/0216119 A1     Sep. 29, 2005

Related U.S. Application Data

(60) Provisional application No. 60/524,619, filed on Nov. 25, 2003.

(51) Int. Cl.
*G06Q 90/00* (2006.01)
(52) U.S. Cl. .................. 235/385; 235/375; 235/384
(58) Field of Classification Search ............... 235/385, 235/384, 375; 705/404, 406
See application file for complete search history.

(56) References Cited

U.S. PATENT DOCUMENTS

| | | | |
|---|---|---|---|
| 6,208,910 B1 * | 3/2001 | Michael et al. ............. | 700/225 |
| 6,285,916 B1 * | 9/2001 | Kadaba et al. .............. | 700/222 |
| 6,510,992 B2 * | 1/2003 | Wells et al. ................ | 235/385 |
| 6,701,217 B1 * | 3/2004 | Sansone ...................... | 700/227 |
| 6,724,308 B2 * | 4/2004 | Nicholson ................. | 340/572.1 |
| 6,738,689 B2 * | 5/2004 | Sansone ...................... | 700/223 |

OTHER PUBLICATIONS

Notification of Transmittal of the International Search Report and the Written Opinion of the International Searching Authority, or the Declaration. International Application No. PCT/US04/31956. International Filing Date Sep. 30, 2004. Applicant: United States Postal Service, 7 pages.

* cited by examiner

*Primary Examiner*—Ahshik Kim
(74) *Attorney, Agent, or Firm*—Finnegan, Henderson, Farabow, Garrett & Dunner, L.L.P.

(57) ABSTRACT

Methods and systems are provided for tracking the nesting of delivery items can include using a passive RFID-type or an auto-detection type communication device to determine which mail handler picks up a particular tray from a location, such as the end of a conveyor system. When the mail handler places the tray in a container, another RFID-type device can be used to detect into which container the mail handler placed the tray. This information may then be passively and/or wirelessly transmitted to an application server that may store the information in a database to verify and validate, in real time, that the tray was placed into the correct container. These methods and systems are equally applicable to other nesting environments, including for example, the placing of containers into transportation vehicles.

33 Claims, 4 Drawing Sheets

METHODS AND SYSTEMS FOR TRACKING DELIVERY ITEMS

CROSS-REFERENCE TO RELATED APPLICATIONS

This application claims the benefit of priority from U.S. Provisional Application No. 60/524,619 filed on Nov. 25, 2003 to Daryl S. Hamilton and entitled "Methods and Systems for Tracking Delivery Items," which is fully incorporated by reference herein, in its entirety and for all purposes.

BACKGROUND OF THE INVENTION

1. Field of the Invention

The invention relates to the field of delivery services, and more specifically, systems and methods for tracking delivery items.

2. Description of the Related Art

Mail delivery services routinely track mail to ensure its efficient processing. This tracking may be at various stages, levels or quantities within the mail processing system. For example, this tracking may involve individually mailed items, trays of mailed items or larger transportation containers. These transportation containers can include, for example, the General Purpose Mail Container (GPMC), the Eastern Region Mail Container (ERMC), the All Purpose Container (APC), and the like. One concept used in tracking is the idea of "nesting" mailed items, trays or containers to aggregates at various levels (i.e., letters-to-trays, trays-to-containers, containers-to-transportation). This nesting strategy allows items to be grouped and tracked at a macro level, while still being able to track at the micro level. This simultaneous tracking at both the macro and micro levels is possible through the conventional concepts of inheritance, aggregation and association.

Initiatives used, for example, by the United States Postal Service ("USPS") give customers, such as major mailers, the ability to track at the lowest aggregate level, i.e., individual mail piece. Other programs might track, for example, trays, bundles of trays (or flats), sacks, pallets or containers prepared by large mailers with the nesting information provided by mailers through electronic manifests. Additional programs might be capable of creating electronic manifests for containers at Terminal Handling Sites ("THS") by scanning trays and sacks as they are loaded into air transportation containers.

As more key infrastructure components are put into place, such as having the ability to uniquely identify trays, flats and containers of mail via programs such as, for example, the Enhanced Tray Label and the Mail Transport Equipment Labeler programs, there is a growing need to expand the tracking and nesting of delivery items including the nesting of trays into transport containers (e.g., GPMC, ERMC, APC, etc.), transport containers into transportation vehicle (e.g., planes, vans, trucks, trains, ships, etc.), and so on.

Accordingly, there is a need for improved methods and systems for tracking the nesting of delivery items.

SUMMARY OF THE INVENTION

In accordance with the invention, methods and systems are provided comprising a method for tracking the nesting of delivery items that includes transmitting information identifying a first container in response to a trigger indicative of the first container being moved by a handler, transmitting information identifying a second container in response to a trigger indicative of the handler placing the first container into the second container, and associating the information identifying the second container with the information identifying the first container.

It is to be understood that both the foregoing general description and the following detailed description are exemplary and explanatory only and are not restrictive of the invention, as claimed. The accompanying drawings, which are incorporated in and constitute a part of this specification, illustrate embodiments of the invention and together with the description, serve to explain the principles of the invention.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE INVENTION

The present invention will now be described in detail with reference to the drawings, which are provided as illustrative examples of the invention so as to help enable those skilled in the art to practice the invention. Notably, the figures and examples below are not meant to limit the scope of the present invention. Where appropriate, the same reference numbers will be used throughout this detailed description in conjunction with the drawings to refer to the same or like parts. Where certain elements of the present invention can be partially or fully implemented using known components, only portions of such known components that are necessary for an understanding of the present invention will be described in detail, while other portions of such known components will be omitted so as not to obscure the invention. Further, the present invention encompasses present and future known equivalents to the components referred to herein by way of illustration.

Figure 1:
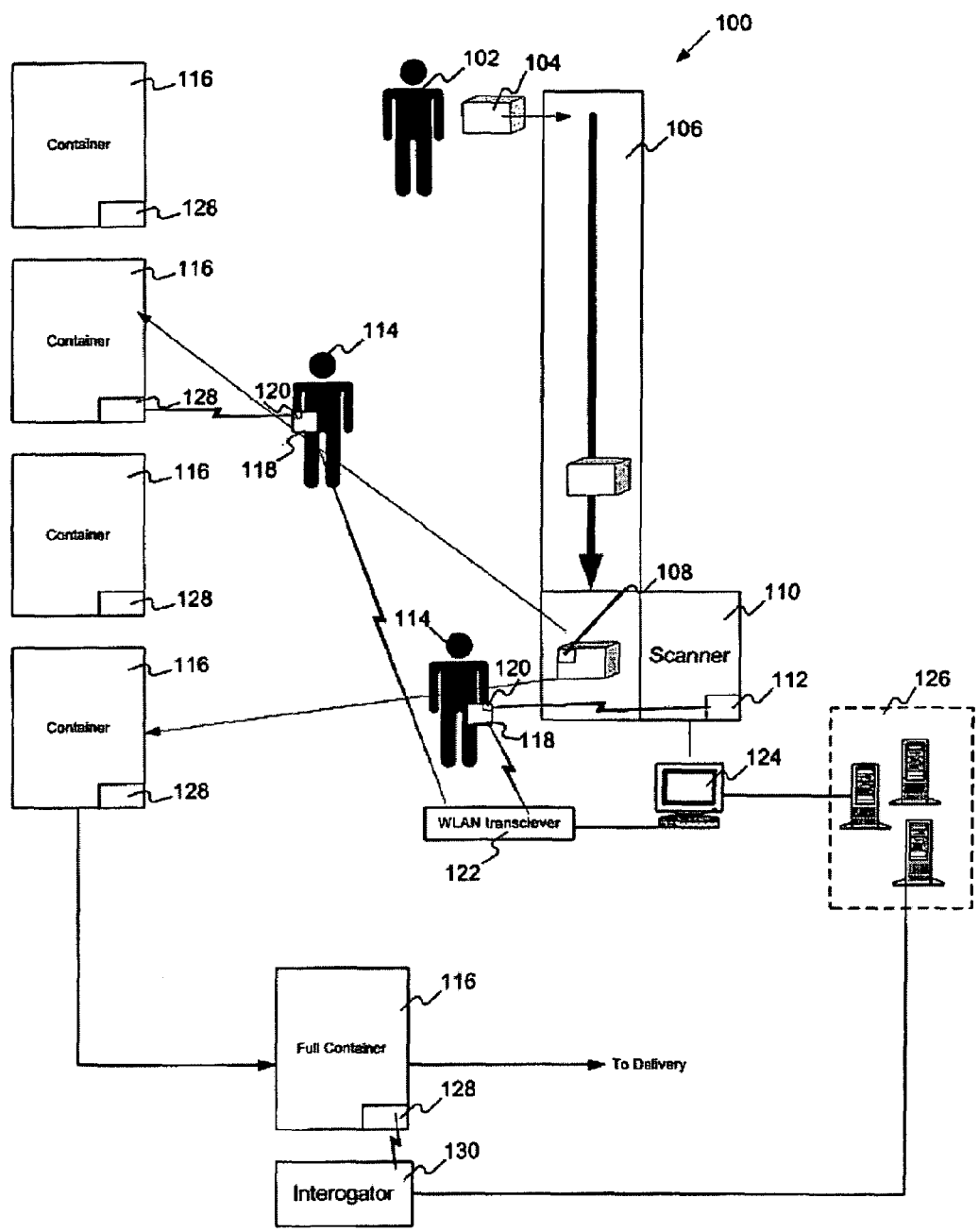
FIG. 1 illustrates a conceptual diagram of a delivery center, in accordance with methods and systems consistent with embodiments of the invention.

FIG. 1 illustrates a conceptual diagram of a delivery center 100, in accordance with methods and systems consistent with embodiments of the invention. The conceptual diagram of FIG. 1 is exemplary only and is not meant to limit the invention; any one of numerous such delivery centers is capable of supporting embodiments of the invention. As illustrated, a mail handler 102 can place trays 104 on a conveyor system 106. It is contemplated for some embodiments of the invention that mail handler 102 can be human, automated robotic handlers or any form of transport means. As used herein, a tray 104 is a container used to hold delivery items, such as, for example, letters, packages, mail flats, and the like. These trays 104 may include a label 108 identifying the tray 104. The label 108 can be, for example, a 24-digit Code 128 UCC/EAN barcode label, as specified, for example, by any one of many Enhanced Tray Label specifications. Conveyor system 106 may be, for example, a gravity-driven or motorized conveyor or set of conveyors, such as the type typically found in postal sorting or distribution operations. Conveyor system 106 may also vary in length, size and shape and may include a tray stopping mechanism at the end of the conveyer.

Conveyor system 106 can transport trays 104 to the end of conveyor system 106 where, for example, it reaches a fixed barcode scanner 110. This scanner 110 may be any suitable scanner for scanning label 108, such as, for example, a stationary UCC barcode scanner. Scanner 110 may have a Radio Frequency (RF) tag 112 attached to it that may be, for example, a Read Only or Read/Write RF tag, such as those used in Radio Frequency Identification (RFID) systems and commercially available from, for example, Identec Solutions of Austria. Although, embodiments of the invention are discussed with regard to RFID systems, it should be understood that other types of wireless systems or passive/active auto detection strategies may be used, such as, for example active radio tags, optical tags, and the like.

Scanner 110 may be connected to an application server 124. This application server 124 may be any appropriate type of computer or handheld device functioning under any operating system. Application server 124 may store information regarding tray labels, RFID tag identifications, and other related RF tag data, as well as information regarding RF interrogators. An RF interrogator can be any suitable device for reading information from RFID tags. This application server 124 may also be connected to a database 126 for retrieving and storing information. This connection may be, for example, via any wired or wireless network, such as, for example, an internal USPS network.

Mail handlers 114 may be positioned at the end of conveyor system 106. These mail handlers 114 may be individuals who receive trays 104 from the end of conveyor system 106 and move them to the proper transport container 116. It is contemplated for some embodiments of the invention that mail handlers 114 can be human, automated robotic handlers or any form of transport means.

As used herein, a transport container is any type of mail transport equipment for use in moving mail within a delivery center 100 or between delivery centers, such as, for example, railroad containers, bulk mail center over-the-road (BMC-OTR) containers (BMC Heavy), BMC in-house containers (BMC light), CON-CON containers, Eastern Region Mail Containers (ERMC) without shelves, ERMC with shelves, orange ERMC (plastic), General Purpose Mail Container (GPMC), wire containers and the like.

Transport containers 116 may be equipped with unique RFID+Presence Detection (RFID+PD) tags 128 for sending an identifier capable of identifying transport container 116 in response to detecting a RFID interrogator 120 within its range. These RFID+PD tags 128 may be, for example, commercially available RFID+PD tags, such as those commercially available from Identec Solutions of Lustenau, Austria. Additionally, although embodiments herein are discussed with regard to RFID+PD tags, it should be understood that in other embodiments RFID tags, PD tags, RF tags, or other suitable wireless devices may be used.

Mail handlers 114 may be equipped with a portable communication device 118, such as a wireless personal data assistant (PDA) or other suitable wired or wireless portable device. This portable communication device 118 may be, for example, a PocketPC™ or Palm™ computing type device and may, for example, use a wireless protocol, such as IEEE 802.11, 802.16 or other such wireless protocol. This portable communication device 118 may also include a Radio Frequency (RF) interrogator 120 that can trigger the identifying RF, RFID, PD, or RFID+PD tags to respond with a modulated RF message. For example, portable communication device 118 may be a pocket PC such as 2×PPT2846 PocketPCs (PPC) from Symbol Technologies, Inc. of Holksville, N.Y. Device 118 may also include, for example, a PCMCIA slot or be placed in a PCMCIA sled. Also, RFID interrogators 120, such as, for example, two i-Card interrogators equipped with a "logical pyramid" algorithm commercially available from Identec Solutions may be inserted into device 118 via a PCMCIA connection.

The exemplary "logical pyramid" algorithm can determine the exact container into which a handler places a tray 104. The algorithm combines various metrics in making this determination, such as, for example: the presence detection device producing a particular reading, the RF tag returning a threshold response, the dB level of the RF tag broadcast, and the like. The triggering event in this example can be the RFID+PD 128 reporting a presence within the container.

Additionally, delivery center 100 may include a wireless transceiver 122 connected to application server 124 for communicating wirelessly with mail handlers' portable communication devices 118. This wireless transceiver 122 may use the same wireless protocol as portable communication device 118, such as, for example, an IEEE 802.11 protocol, so as to provide portable communication device 118 with wireless connectivity to application server 124. However, a wired communication protocol can also work with embodiments of the invention.

Once a transport container 116 becomes full, it may be electronically and physically closed. After which, it may be moved through a "choke point" to a separate area of delivery center 100. A choke point, for example, is a location within the delivery center 100 through which transport container's moving to a particular location must pass for identifying the containers 116 passing through the choke point. The choke point may include an RF interrogator 130 for reading the transport container's RFID+PD tag 128. RF interrogator 130 may be connected to application server 124 for transferring information regarding the containers 116 (or, more particularly, the RFID+PD tags 128 connected to the containers 116) that pass through the choke point.

Figure 2:
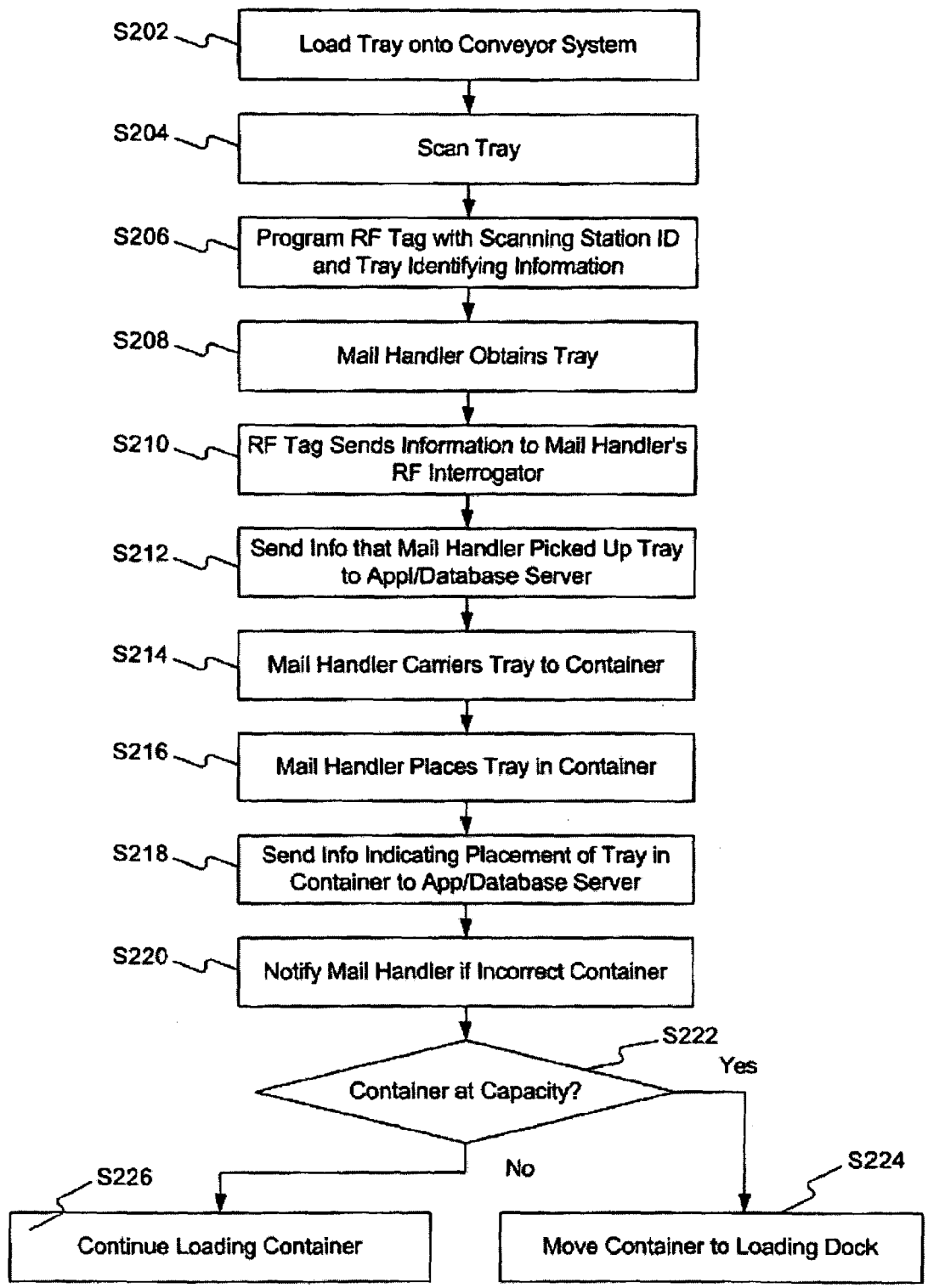
FIG. 2 illustrates a flow chart of a method for automatically tracking the nesting of delivery items, in accordance with methods and systems consistent with embodiments of the invention.

FIG. 2 illustrates a flow chart of a method for automatically tracking the nesting of delivery items, in accordance with methods and systems consistent with embodiments of the invention. FIG. 2 will be described in reference to FIG. 1. A mail handler 102 first loads trays 104 arriving at delivery center 100 onto conveyor system 106 (S202). In one embodiment, the trays 104 may be loaded onto the conveyor system 106 one at a time to singulate the handling of each unit load tray. Once the trays reach the end of conveyor system 106, scanner 110 can automatically scan the tray's label 108 (S204). As discussed above, in this example, label 108 can uniquely identify tray 104, and may be, for example, a 24-digit Code 128 UCC/EAN barcode label, as specified by, for example, Enhanced Tray Label specifications.

Barcode scanner 110 may then associate a unique, programmed RF tag 122 identifier for the scanning station (hereinafter, the scanning station ID) with the information from the uniquely identified scanned label 108 from tray 104

(hereinafter tray ID) (S206). In one example, conveyor system 106 may also stop until the tray 104 that has just been scanned is removed.

A mail handler 114, such as, for example, a postal center employee, may then obtain the scanned tray 104 (S208). The mail handler's RF interrogator 120, in response to coming within range of RF tag 122 may trigger RF tag 122 to send scanning station ID and tray ID to RF interrogator 120 for future confirmation that the tray will be placed in the correct container 116 based upon a logical nesting of trays to a container (S210). As discussed above, mail handler 114 may have a portable communication device 118, such as a PocketPC (PPC) device, that incorporates a passive RFID interrogator 120 as well as wireless connectivity with application server 124.

Portable communication device 118 may then send the information received from RF tag 122 to application/database server 124 via wireless transceiver 122 informing application/database server 124 that mail handler 114 picked up tray 104. (S212). For example, portable communication device 118 may send application/database server 124 information identifying mail handler's RFID interrogator 120 (hereinafter RFID interrogator ID) along with the RFID information received from scanner's RFID tag 112 that includes the tray ID and the scanning station ID.

Mail handler 114 may then carry tray 104 to the appropriate transport container 116 (S214). In this example, although mail handler's RF interrogator 120 may detect numerous signals from various transport container RFID+PD tags 128 as the mail handler 114 passes, RF interrogator 120 ignores these signals until it receives a signal from RFID+PD tag 128 of the appropriate transport container 116. RF interrogator 120 may determine the appropriate container by executing a "logical nesting" pyramid algorithm that determines the transport container 116 into which mail handler 114 placed tray 104. This nesting/pyramid algorithm can include, for example, a combination of the presence detection device and assumed nesting associations to produce and trigger the events that will confirm and record the proper placement of the uniquely identified tray into the uniquely identified larger container.

Mail handler 114 can then place the tray 104 into transport container 116 (S216). Portable communication device 118 may then, in response to RFID+PD tag 128 reporting the presence of the tray within the container, send information to application server 124 informing application server 124 that mail handler 114 has placed tray 104 in transport container 116 (S218).

Additionally, the "logical nesting" pyramid algorithm, in conjunction with a physical indicator (e.g., light, sound, vibration, etc.) that may be located, for example, on transport container's RFID+PD tag 128 tag, may also act as a physical guide to inform mail handler 114 whether tray 104 was placed into the correct container 116 (S220). For example, a visible indicator (e.g., LED, etc.) may turn red to indicate that it is the incorrect container, or it may turn green to indicate it is the correct container. Further, portable communication device 118 may maintain communications with application server 124 (e.g., via a 802.11b wireless card built into the portable communication device 118), not only updating progression data and identification information, but also real-time error checking of tray 104 containerization against the stored database information on nested unit loads.

Once transport container 116 is filled to capacity (S222), container 116 can be electronically and physically closed and may then be moved through a choke point with a stationary RF Interrogator 130 to a separate area, such as, for example, through a dock door to a docking area for shipment of container 116 to a different delivery center (S224). This stationary RF Interrogator 130 should be the same as, but may also differ from, RF Interrogator 120 of portable communication device 118 by, for example, using a simpler logical pyramid that is only concerned with reading all RFID tags within a certain range. If transport container 116 is not at capacity, it may continue to be loaded with unit-loaded trays 104 (S226).

In another embodiment, each transport container 116 may also have a paper based barcode placard associated with it that provides a visual unique identification of its contents (e.g., type of mail, zip code and final destination, etc.). These placards may be applied before any tray loading occurs (thus giving the mail handler visual indication of where to put the trays). When a mail handler initially sets up the area holding transport containers 116 (hereinafter referred to as the bullpen area), they may associate a unique placard barcode ID with the barcode on transport container's RFID+PD tag 128 and provide this information to application server 124. Then, when mail handler 114 loads trays 104 into transport container 116, application server 124 may associate tray 104 with the information on the transport container's placard (e.g., contents of container, destination, etc.). This association may also occur as a container is filled, taken away, and a new container is put in and set up in order to track the movement of containers 116 and individual trays 104.

Figure 3:
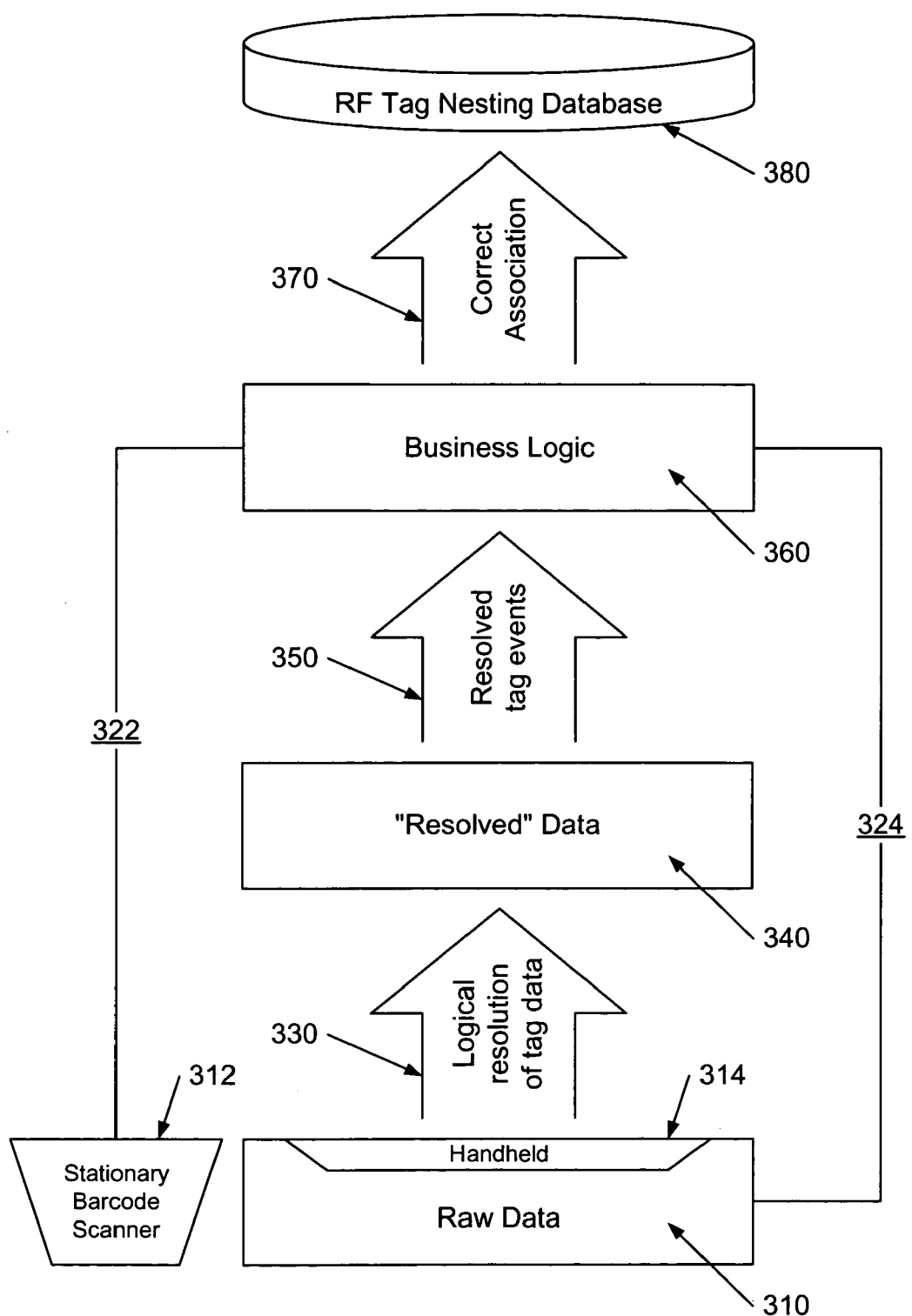
FIG. 3 illustrates an exemplary operational flow diagram, in accordance with methods and systems consistent with embodiments of the invention.

The overall operational strategy according to embodiments of the invention can include data that is collected, passed through a variety of decision-making steps at one or more levels (e.g., the logical pyramid level, the backend business systems level, etc.), and a final answer/association that can be written into one or more local or networked databases. FIG. 3 illustrates an exemplary operational flow diagram, in accordance with methods and systems consistent with embodiments of the invention.

As shown in FIG. 3, raw data can be collected at a base level 310 from multiple sources, such as, for example, a conveyor system's stationary barcode scanner 312 or a handler's handheld device 314. At this base level 310, stationary scanner 312 and handheld device 314 can be mutually exclusive and have no dependence on each other. Event trigger and control data associate with the raw data from handheld 314 can be forwarded directly to the business logic module 324, while all raw data from the stationary barcode scanner 312 can be forwarded directly to the business logic module 322.

The raw data received from handheld 314, that is, the user ID associated with the handheld and the RF tags (e.g., on the tray, container, etc.) that handheld has 'seen,' can then be pushed 330 through a logical resolution module 340 for the tag data. The tag resolution can be completed using a series of logical algorithms that can be capable of correlating a user ID (e.g., handheld ID) to a tag ID (e.g., container) into which a handling unit (e.g., tray, flat, sack, etc.) is being nested. The logical algorithms can be based upon a characteristic of the passive tracking device (i.e., signal strength, number of reads from the tag, duration of reads, etc.). This tag resolution algorithm (TRA) process need not know the identity of the tray at this level, since its raw data input can be limited to the user ID and the tray/container ID (i.e., the RFID tag on the tray/container). Once the TRA process has resolved data of a user ID and tag/container ID, it then pushes 350 the correlated or resolved data to the business logic level 360, which can operate, for example, on a backend server.

The business logic module 360 is where the full associations among the users, trays and containers can reside. The backend server and the business logic can be responsible for gathering the tray data from the point of generation (e.g., via the enhanced data label and the like) and the barcode scanner at the end of the conveyance line, the logical TRA process (e.g., which user saw which tray and into which container each tray was placed), the RFID tag with pressure switch at the end of the conveyance line, and other similar data.

An enhanced distribution label (EDL) in the context of embodiments of the invention can uniquely identify each tray or sack. The common UCC/EAN Code 128 barcode format can be used for the EDL. However, other formats of unique identification can also be used. The information contained in the barcode can be include, for example, a destination postal code, a contents identifier number, some service-related information, a mail processing code, and the like. This exemplary EDL can facilitate the ability to track the tray or sack as it leaves an origin point and when it arrives at a destination. Information in the EDL can also be used to link individual handling units to specific containers and facilitate container nesting and tracking throughout the entire distribution and delivery process.

Through a series of metrics and decision-making programs, the business logic module 360 can decide and correlate which handler placed which tray into which container. The backend system can also simultaneously know whether or not a tray went into the correct container, and if it is not in the correct container, can notify the user that the tray was incorrectly placed. Once the backend server and business logic has made the full association of tray, user and container data, the full association is then pushed 370 to, and stored in, a database 380. As will be evident to those skilled in the relevant art, database 380 can be one or more separate databases that are collocated or networked with the other elements of this embodiment.

The backend server application 360 portion of the invention can consist of a stand-alone console Java application that can include several modules, each performing a separate task. There need not be a user interface to speak of; the console can print messages from the application modules and respond to simple commands typed into the console. However, a network based user interface can be added, such as, for example, a browser enabled graphical user interface. The modules of the backend server application 360 can include, for example: an EDL importer, a scanner interface, a tag event processor, various database scripts, and the like.

The EDL importer module can run when requested at the console. It can, for example, read an EDL export file in a specified path and can create one new 'tray' database record for each EDL line in the export file. Each 'tray' record can contain all the data associated with an EDL, and can have additional fields for tracking that unit's status through the system. This module can exit as soon as the import is complete.

The scanner interface module can continuous try to read from the communications connection to the stationary barcode scanner 322 (e.g., an RS-232 serial port cable, an IEEE 801.11 b wireless connection, etc.). When data is received from the scanner, this module can then attempt to find the corresponding tray ID in the tray database (i.e., from a previously imported EDL record). The tray record can be modified to show that tray's status is 'scanned.' This module can be started in a new thread and can be execute continuously until it is stopped.

The tag event processor module can be used to receive 'tag events' 324 from the raw data module 310. The tag event processor can use the database server script(s) to process such received data. 'Tag events' are any events that occur as the result of the data server scripts, described below. These can be communicated by placing a record in a 'tag event' table, with data specific to the type of action (or event) that is being communicated. For all events, a timestamp can be added to the record. The timestamp can be used to compare and process a chronological order of events. The types of events can include, for example: a tray being picked up by a user, a tray being placed into a container, and the like.

In the example of a tray being picked up by a user, the information received in the 'tag event' record can include can include the user ID of the user and the tray ID. The user's ID can be set in the 'tray' database, which can then associate that tray ID to that user ID and can set that tray's status to 'picked up.' In the example of a tray being placed into a container, the information received in the 'tag event' record can include the user ID of the user, the tray ID and the container ID. The 'tray' database can be searched to find the tray to which this user is assigned. Then, the container ID can be placed in that 'tray' record and that tray's status can be set to 'in container.'

The various database scripts can be programmed to manipulate the volumes of data received from the RF tags (via an interrogator) and save the results to the 'tag event' table for use as described above. Specifically, in this embodiment, the scripts can perform the following actions: determine which user picked up a tray when a pressure sensor switch is opened and determine into which container a user placed a tray.

The following provides a description of various possibilities for placement of RFID+PD tags 128 on transport container 116. It should be understood that the following is merely an illustrative list of possible placements and is not exhaustive and not intended to be limiting.

Figure 4:
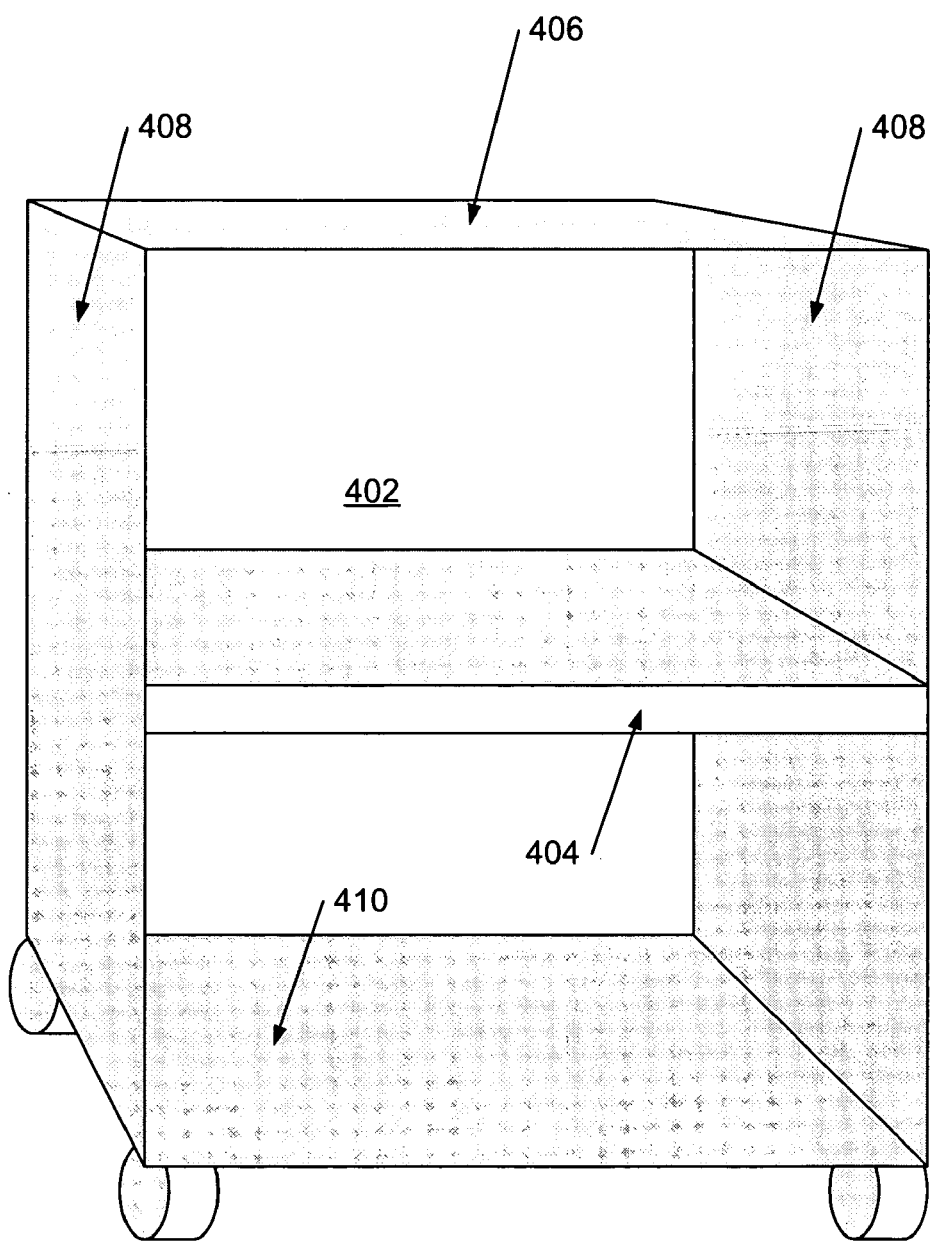
FIG. 4 illustrates a block diagram of an exemplary transport container, in accordance with methods and systems consistent with embodiments of the invention.

FIG. 4 illustrates a block diagram of an exemplary transport container 116, in accordance with methods and systems consistent with embodiments of the invention. The exemplary transport container 116 shown in FIG. 4 will be used in the below description of exemplary placements for RFID+PD tag 128. It should be understood that FIG. 4 is simply a generalized figure of a transport container, for use in explaining possible placements of RFID+PD tags on the transport container, and should not be used to limit the scope of the invention.

A first possible location for placement of RFID+PD tags 128 on containers 116 is middle back-wall 402 of container 116. That is, RFID+PD tag 128 is mounted in the center of the container's back wall (as faced by the worker), aimed outward (towards the worker). A second possible location for placement of RFID+PD tag 128 is within container's dividing tray 404, aimed both up and down. This may include, for example, mounting a single RFID tag with multiple PD sensors or multiple RFID tags each with a single PD sensor within container's dividing tray 404.

A third possible location for placement of RFID+PD tag 128 is on the middle top of container 406, aimed downwards. A fourth possibility is mounting RFID+PD tag 128 on one of side panels 408, aimed towards the opposite side panel. A fifth possibility is mounting the RF tag on the floor of container 410 aimed upwards.

A sixth possibility is mounting multiple PD sensors with each 'wired' to a single tag that may, for example, look visually like a thin book mounted on the container where the RFID tag and various PD sensors are contained. In this example, RFID+PD tags 128 may be mounted such that sensors are located both above and below metal shelf 404.

A seventh possibility is to mount multiple RFID+PD tags 128 in a configuration with different PD sensor settings and different mounting brackets for each container 116. Since some embodiments may include a large number of containers deployed at thousands of locations with untrained people, it may be desirable to stock different tag configurations that have been factory tuned and tested in the same manner as used by home security motion detector manufacturers using "dog-tolerant" sensors, "heat and motion activated" sensors, "laser beam and heat" sensors, and the like. In this example, the sensor can be able to detect the difference between placing a tray within the containers and closing container front gates.

An eighth possibility is to "auto-calibrate" a tag by installing, for example, RFID+PD tag 128 in accordance with detailed installation instructions for each container 116 and then initiate a calibration mode that sets the "normal" and "tripped" sensor readings on the actual container.

The following provides a description of various possibilities for placement of the antenna for RF interrogator 120 on mail handler 114. It should be understood that the following is merely an illustrative list of possible placements and is not exhaustive.

One possible option is to use a hip-mounted portable communication device 118 (e.g., PocketPC, Palm, etc.) that includes an internal RF Interrogator 120 and an internal antenna. A second possibility is to use a wrist-mounted antenna or an antenna mounted elsewhere on mail handler 114, connected via a wire to a hip-mounted portable communication device 118 with an internal RF interrogator 120. A third possibility is to use a "tool belt" or vest that holds both portable communication device 118 (with an internal RF interrogator 120) and an antenna that is 'woven' into the belt or vest.

The following provides a description of exemplary methods for associating the unique label (e.g., barcode) on a tray 104 with the identity of mail handler 114 (i.e., mail handler's portable communication device 118 and associated RF interrogator 120) who has acquired that tray. Several examples are provided below using different logic in which each mail handler 114 takes one tray 104 at a time. However, as will be evident to those skilled in the art after the teaching of this invention, each mail handler 114 can take more than one tray 104 at a time.

A first example requires that application server 124 reconcile the data that is scanned from tray label 108 by stationary scanner 126 with portable communication device 118 of mail handler 114 who picks up tray 104. This may be accomplished by, for example, associating the last scanned tray label 108 with the first RF interrogator 120 comes within range of RF tag 112 on stationary scanner 110. A second example is similar to the first example, but uses a time stamp system rather than a queue system to reconcile the tray data to the personal interrogator. A third example requires application/database server 124 to program RF tag 112 of scanner 110 to broadcast the tray label (barcode) data and reconcile the data using mail handler's portable communication device 118, rather than reconciling at the server side.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention can be employed without a corresponding use of other features. Further, those skilled in the art will understand that variations can be made in the number and arrangement of components illustrated in the above figures. It is intended that the scope of the appended claims include such changes and modifications.

What is claimed is:

1. A system for tracking the nesting of delivery items, comprising:
   a first container for holding delivery items;
   a first device for transmitting first identifying information regarding the first container in response to a first indication that the first container is moved by a handler;
   a second container for holding the first container;
   a second device for transmitting second identifying information regarding the second container in response to a second indication that the first container was placed in the second container by the handler;
   a third device for receiving the first and second identifying information from the first and second device, respectively, and for transmitting the first and second identifying information and third identifying information regarding the third device; and
   a computing system for receiving the first, second and third identifying information from the third device and associating the first container with the second container in response to the first, second and third identifying information.

2. The system of claim 1, wherein the first container includes a tray of the delivery items.

3. The system of claim 1, wherein the first device is an RF identification tag coupled to the first container.

4. The system of claim 1, wherein the first identifying information includes at least one first item selected from a group of first items, the group of first items including a first unique identifier, a delivery item type, a delivery item destination postal code, a delivery item final destination address, a delivery item contents identifier, a delivery item type-of-service identifier, and a delivery item processing code.

5. The system of claim 4, wherein the first unique identifier includes a barcode number scannably representative of at least one of the other first items in the group of first items.

6. The system of claim 1, wherein the first indication includes a signal generated by the third device after an interrogator of the third device initiates reception of the first identifying information from the first device.

7. The system of claim 1, wherein the second container includes at least one of a railroad container, a bulk mail center (BMC) over-the-road container, a BMC in-house container, an Eastern region mail container (ERMC) without shelves, an ERMC with shelves, a plastic ERMC, a general purpose mail container, and a wire container.

8. The system of claim 1, wherein the second device is an RF identification tag coupled to the second container.

9. The system of claim 1, wherein the second identifying information includes at least one second item selected from a group of second items, the group of second items including a second unique identifier, a container type, a container final destination, a container contents identifier, and a container processing code.

10. The system of claim 9, wherein the second unique identifier includes a barcode number scannably representative of at least one of the other second items in the group of second items.

11. The system of claim 1, wherein the second indication includes signal generated by the third device after an interrogator of the third device initiates reception of the second identifying information from the second device.

12. The system of claim 1, wherein the third device is a portable computing device operated by the handler.

13. The system of claim 1, wherein the third identifying information includes a third unique identifier.

14. The system of claim 13, wherein the third unique identifier includes a third device identification number representative of the third device.

15. The system of claim 1, wherein the first, second, and third identifying information are transmitted and received wirelessly.

16. The system of claim 1, wherein the computing system further comprises a plurality of modules for receiving the first, second and third identifying information, for resolving the received information, for associating the resolved information and for storing the associated data in a database.

17. A method for tracking the nesting of delivery items, comprising the steps of:
transmitting first identifying information identifying a first container in response to a first indication, the first indication indicative of the first container being moved by a handler;
transmitting second identifying information identifying a second container in response to a second indication, the second indication indicative of the handler placing the first container into the second container;
receiving the first and second identifying information at a portable computing device, the portable computing device comprising third identifying information; and
associating the first, second, and third identifying information.

18. The method of claim 17, wherein the first container includes a tray of delivery items.

19. The method of claim 17, wherein transmitting the first identifying information is performed by an RE identification tag coupled to the first container.

20. The method of claim 17, wherein the first identifying information includes at least one first item selected from a group of first items, the group of first items including a first unique identifier, a delivery item type, a delivery item destination postal code, a delivery item final destination address, a delivery item contents identifier, a delivery item type-of-service identifier, and a delivery item processing code.

21. The method of claim 20, wherein the first unique identifier includes a barcode number scannably representative of at least one of the other first items in the group of first items.

22. The method of claim 17, wherein the second container includes at least one of a railroad container, a bulk mail center (BMC) over-the-road container, a BMC in-house container, an Eastern region mail container (ERMC) without shelves, an ERMC with shelves, a plastic ERMC, a general purpose mail container, and a wire container.

23. The method of claim 17, wherein transmitting the second identifying information is performed by an RF identification tag coupled to the second container.

24. The method of claim 17, wherein the second identifying information includes at least one second item selected from a group of second items, the group of second items including a second unique identifier, a container type, a container final destination, a container contents identifier, and a container processing code.

25. The method of claim 24, wherein the second unique identifier includes a barcode number scannably representative of at least one of the other second items in the group of second items.

26. The method of claim 17, further including the step of:
transmitting the first, second, and third identifying information to a computing system.

27. The method of claim 26, wherein the third identifying information includes a third unique identifier.

28. The method of claim 27, wherein the third unique identifier includes a third device identification number representative of the portable computing device.

29. The method of claim 26, wherein the first, seconds and third identifying information are transmitted wirelessly.

30. The method of claim 26, wherein the first indication includes a signal generated by the portable computing device after an interrogator of the third device initiates reception of the first identifying information from the first device.

31. The method of claim 26, wherein the second indication includes signal generated by the portable computing device after an interrogator of the third device initiates reception of the second identifying information from the second device.

32. The method of claim 26, wherein the computing system comprises a plurality of modules for receiving the first, second and third identifying information, for resolving the received information, for associating the resolved information and for storing the associated data in a database.

33. The method of claim 32, wherein associating the resolved information includes associating the first container with the second container in response to the first, second, and third identifying information.

* * * * *